E. P. FOWLER.
EAR IRRIGATING DEVICE.
APPLICATION FILED FEB. 21, 1908.
989,839.
Patented Apr. 18, 1911.
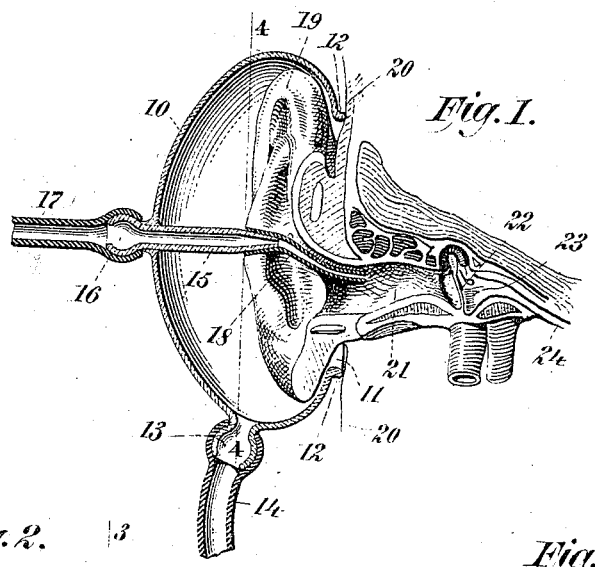
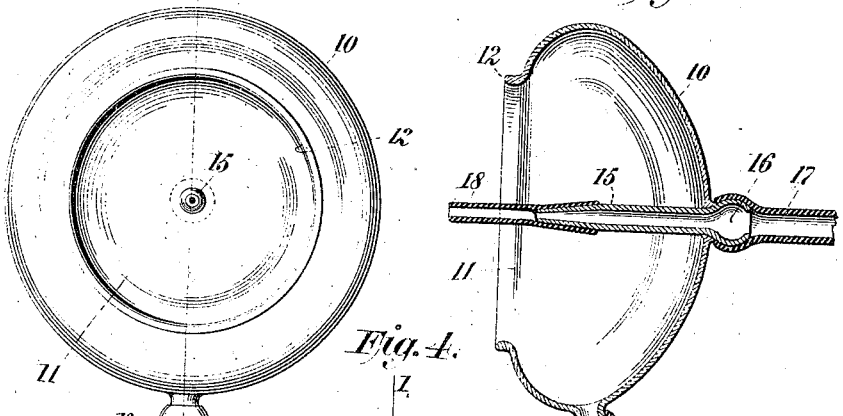
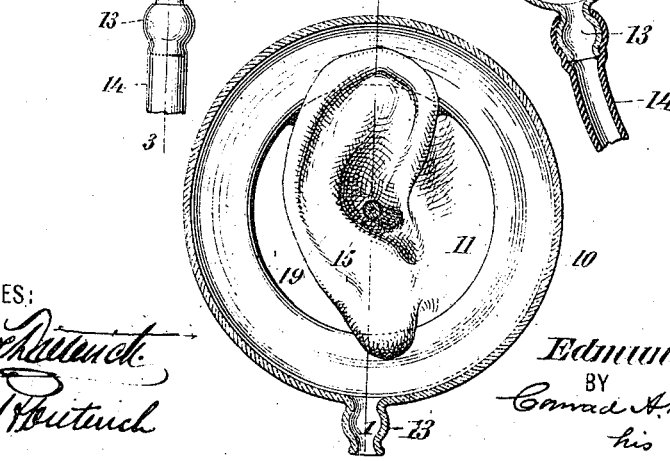
WITNESSES:
INVENTOR
Edmund P. Fowler
BY
his ATTORNEY

UNITED STATES PATENT OFFICE.

EDMUND P. FOWLER, OF NEW YORK, N. Y.

EAR-IRRIGATING DEVICE.

989,839.        Specification of Letters Patent.        Patented Apr. 18, 1911.

Application filed February 21, 1908. Serial No. 416,987.

*To all whom it may concern:*

Be it known that I, EDMUND P. FOWLER, a citizen of the United States, residing in the city of New York, borough of Manhattan, in the county and State of New York, have invented certain new and useful Improvements in Ear-Irrigating Devices, of which the following is a full, clear, and exact specification.

My invention relates to means for irrigating recesses of cavities in the human anatomy, and the same has for its object more particularly to provide a simple, efficient and reliable apparatus for irrigating or douching the cavities of the ear for the purpose of treating diseases affecting the same.

Further, said invention has for its object to provide an apparatus which is so constructed that the nozzle portion thereof will readily adjust or accommodate itself to the cavity when the apparatus is placed in position over the same.

Further, said invention has for its object to provide an apparatus by means of which the irrigating fluid may be introduced into the cavity either under air pressure produced within said apparatus, or under a partial vacuum, or alternately under pressure and vacuum, as desired.

Further, said invention has for its object to provide an apparatus which is so constructed that its inclosing portion will fit over and inclose the ear, and catch all the fluid discharged into the ear.

Further said invention has for its object to provide an apparatus which is so constructed that it will be impossible for the user to injure in the slightest degree the parts subjected to treatment.

To the attainment of the aforesaid objects and ends my invention consists in the novel details of construction, and in the combination, connection and arrangement of parts hereinafter more fully described, and then pointed out in the claims.

In the accompanying drawings forming part of this specification wherein like numerals of reference indicate like parts, Figure 1 is a sectional view taken on the line 1—1 of Fig. 4, showing one form of apparatus constructed according to, and embodying my said invention, as applied to a human ear; the outer ear being shown in front or end view, and the inner ear and related parts in section; Fig. 2 is a face view showing the inclosing receptacle and the nozzle therein; Fig. 3 is a central section, taken on the line 3—3 of Fig. 2, showing portions of the intake and discharge tubes attached thereto, and Fig. 4 is a section taken essentially on the line 4—4 of Fig. 1.

In said drawings the apparatus is shown as composed of an inclosing receptacle 10 adapted to inclose an ear. Said receptacle may be made of any desired form and material, but preferably of glass, and has a circular opening 11 at its inner side of smaller diameter than said receptacle provided with a bead 12, adapted for contact with the side of the head immediately adjoining the ear.

13 denotes an outlet nipple provided at the lower edge of said receptacle 10 to which is attached one end of a rubber tube 14, which may be of any suitable or required length, but by preference is made about two to three feet in length, depending upon the degree of suction desired.

15 denotes a nozzle which may be made either integral with said receptacle 10, or separately therefrom, and then secured adjacent to its outer end to said receptacle at the middle thereof and having its reduced end extending into said receptacle 10 to a point a short distance from the opening 11 at its inner side. The outer projecting end of said nozzle 15 is provided with an enlarged portion 16 to receive one end of a rubber tube 17 communicating at its other end with a suitable source of fluid supply. To the inner reduced end of the nozzle 15 is attached a small, soft rubber tube section 18 which projects through the aperture 11 and beyond the edge thereof.

19 denotes the outer ear, 20 the side of the head immediately adjoining and surrounding the same, 21 the external auditory canal in the ear, 22 the tympanic membrane or drum, 23 the middle ear or tympanum, and 24 the Eustachian tube which communicates with the nose.

The operation of the apparatus is as follows: If, for example, it is desired to treat or irrigate the external auditory canal the receptacle 10 is adjusted over the ear, the top of the flexible nozzle being at the same time inserted into the canal 21 within which it will automatically adjust itself inward until the bead or rim 12 of the receptacle 10 comes into close contact with the side of the head. Fluid is thereupon permitted to pass from a suitable font or container through the tube 17 into the nozzle 15 and be discharged from the flexible section 16 thereof into the auditory passage thereby flushing, cleansing and medicating the same and falling back through the auditory canal 21 into the receptacle 10 whence it will be carried through the discharge tube 14 leading from the outlet nipple 13 at the lower edge thereof. If it is desired to flush out the parts and at the same time apply suction it simply becomes necessary to hold the bead or rim 12 of the receptacle 10 closely against the side of the head, and then permit the fluid to flow through the flexible section 16 of the nozzle into the ear and out again into the receptacle 10 and thus through the discharge pipe 14 and nipple 13. In this way a suction will be established by the flow of the fluid from the nozzle 15 and its being conducted from the receptacle 10 through the outlet 14 as long as the receptacle 10 is held to its adjusted position against the side of the head. If it is desired to flush out the parts and at the same time force the fluid into the parts which would fail to be reached by the simple flushing, or by the flushing in the presence of suction, it merely becomes necessary to construct the outlet or discharge tube 14 leading from the outlet nipple 13 for the receptacle 10 sufficiently to cause the fluid discharged from the nozzle 15 into the receptacle 10 to exceed said discharge which is conducted therefrom through the outlet nipple 13 and tube 14 and thus produce an accumulation of fluid in said receptacle which will compress the air contained therein. The compressed air will then pass into and distend all the parts and with a certain quantity of the fluid find its escape through any openings present, such as a perforation of the auditory passage 21, the membrane 22, tympanic cavity 23, or the Eustachian tube 24. By releasing the pressure on the discharge tube 14, and giving the same its full opening an exhausting action is produced which will draw all the fluids back through the above mentioned openings, auditory passage 21 and Eustachian tube 24; the exhausting action being partly due to the fact that the discharge outlet and tube 14 of the receptacle 10 are of greater internal diameter than the nozzle 15 and its flexible section 16 attached thereto.

Having thus described my invention, what I claim and desire to secure by Letters Patent is:

1. An ear irrigating device, comprising a receptacle provided with an opening in one side thereof having its entire edge in the same plane and adapted to freely inclose the ear, a rigid nozzle section secured in the opposite side of said receptacle, a flexible tubular section secured to the inner end of said rigid nozzle section having its free end extending outwardly through the opening in the side of said receptacle and adapted to conform itself to the contour of the external auditory canal, and means on said receptacle for connecting said nozzle with a source of fluid supply, substantially as specified.

2. An ear irrigating device, comprising a receptacle provided with an opening in one side thereof having its entire edge in the same plane and adapted to freely inclose the ear, a rigid nozzle section secured in the opposite side of said receptacle and arranged partly within and partly without said receptacle and adapted to be connected with a source of fluid supply, a flexible tubular section secured to the inner end of said rigid nozzle section having its free end extending outwardly through the opening in the side of said receptacle and adapted to conform itself to the contour of the external auditory canal, and an outlet nipple arranged at the lower edge of the said receptacle, substantially as specified.

Signed at the city of New York, in the county and State of New York, this 18th day of February, nineteen hundred and eight.

EDMUND P. FOWLER.

Witnesses:
CONRAD A. DIETERICH,
A. R. ANGUS.